US008164803B2

(12) United States Patent
Roof

(10) Patent No.: US 8,164,803 B2
(45) Date of Patent: Apr. 24, 2012

(54) INFRARED HEAT SOURCE TIED TO IMAGE SCANNER FOR TRANSITIONAL DOCUMENT ERASING

(75) Inventor: Bryan J. Roof, Newark, NY (US)

(73) Assignee: Xerox Corporation, Norwalk, CT (US)

( * ) Notice: Subject to any disclaimer, the term of this patent is extended or adjusted under 35 U.S.C. 154(b) by 565 days.

(21) Appl. No.: 12/404,517

(22) Filed: Mar. 16, 2009

(65) Prior Publication Data

US 2010/0231986 A1 Sep. 16, 2010

(51) Int. Cl.
*H04N 1/04* (2006.01)

(52) U.S. Cl. ........ 358/474; 358/497; 358/496; 358/498; 358/475; 345/641; 348/231.3; 430/19

(58) Field of Classification Search .................. 358/474, 358/497, 496, 498, 475, 509, 501, 505, 518; 345/629, 639, 641; 348/148, 231.3; 430/19
See application file for complete search history.

(56) References Cited

U.S. PATENT DOCUMENTS 5,180,915 A * 1/1993 Ohgoda ........................ 250/585
5,534,709 A * 7/1996 Yoshimoto et al. ........... 250/588
5,644,142 A * 7/1997 Namiki et al. ................ 250/586
6,532,092 B2 * 3/2003 Neushul ..................... 359/211.2
7,336,920 B2 * 2/2008 Anderson et al. ............. 399/341
7,852,366 B2 * 12/2010 Iftime et al. .................. 347/262
2004/0190080 A1 * 9/2004 Kodama et al. ............... 358/474
2006/0222393 A1 * 10/2006 de Jong et al. .................. 399/67
2010/0321740 A1 * 12/2010 Roof ............................. 358/448
2011/0102491 A1 * 5/2011 Kovacs et al. ................... 347/18

OTHER PUBLICATIONS

Bryan J. Roof, "Method for Scheduling Transient Document Erase Cycle", US Patent Application filed concurrently herewith.

Gabriel Iftime et al, "Inless Reimageable Printing Paper and Method", U.S. Appl. No. 12/206,136, filed Sep. 8, 2008.

* cited by examiner

*Primary Examiner* — Negussie Worku

(74) *Attorney, Agent, or Firm* — MH2 Technology Law Group LLP

(57) ABSTRACT

A device which can be used to handle documents which can be written to and erased can include a scan head which can output a first light source for scanning a document and a second light source for erasing an image from a printed document. In one embodiment, the device can further include a third light source for writing or imaging a pattern onto a page.

16 Claims, 3 Drawing Sheets

INFRARED HEAT SOURCE TIED TO IMAGE SCANNER FOR TRANSITIONAL DOCUMENT ERASING

FIELD OF THE INVENTION

This invention relates to the field of printing and imaging devices, and more particularly to a device and method for imaging information onto a print medium, and for erasing previously imaged information from a print medium.

BACKGROUND OF THE INVENTION

Printing devices such as computer printers, photocopiers, etc. which place information onto one or more print media are well established. Less established are devices which print an erasable image onto a print medium. Various marking formulations have been used which provide an image which can be easily erased, requiring an exposure to heat and visible light for a period of less than 10 seconds to effect a complete image erasure. However, these formulations have the drawback of fading over a period of three days or so when exposed to ambient light. Other erasable image marking formulations print a more permanent image and have a lifetime of weeks to months, but have the drawback of being difficult to erase, requiring about two minutes for complete erasure, which is generally considered excessively long for most uses.

An inkless erasable imaging formulation is the subject of U.S. patent application Ser. No. 12/206,136 filed Sep. 8, 2008 and titled "Inkless Reimageable Printing Paper and Method" which is commonly assigned with the present application to Xerox Corp., and is incorporated in its entirety herein by reference. An embodiment of the chemical formulation detailed in the co-pending application comprises a photochromic material, for example an alkoxy modified dithienylethene. Use of this material allows for the imaging of a pattern onto the medium using patterned ultraviolet (UV) light. In use, the print medium is coated with the chemical formulation which is then cured and exposed to a patterned UV light source, such as from a light emitting diode (LED). The UV light chemically alters the formulation to produce a visible image pattern. The image is reasonably stable and remains visible for a longer period of time when exposed to ambient light than conventional erasable inks, for example weeks to months, but is erasable on demand using one or more of visible light, heat, and infrared radiation. The chemical formulation is reprintable such that the same or a different pattern can be printed using a UV light pattern. The formulation comprises the use of an infrared-absorbing dye additive which heats faster than conventional dyes and thus effects complete erasure in a shorter period of time.

With the advent of a rewritable printing formulation which overcomes the competing problems of image longevity versus erasure difficulty found with conventional erasable image printing processes, other problems related to printing and erasing the chemical formulation onto a print medium can be addressed.

SUMMARY OF THE EMBODIMENTS

According to various embodiments, a device for handling a transient document can comprise a scanning light source for illuminating at least one page of a document and an erasing light source for erasing an imaged pattern on at least one page of a transient document. The scanning light source and the erasing light source can both located on a scan head of the device.

According to various other embodiments, a method for handling a document comprises transporting a first page having an image thereon to a scan head and illuminating the first page with a first light source output by the scan head. Using the illumination of the first light source, the first page is scanned. A second page having an image thereon is transported to the scan head, and the second page is illuminated with a second light source output by the scan head. Using the illumination of the second light source, the image on the second page is erased.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

It should be noted that some details of the FIGS. have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts.

Figure 1:
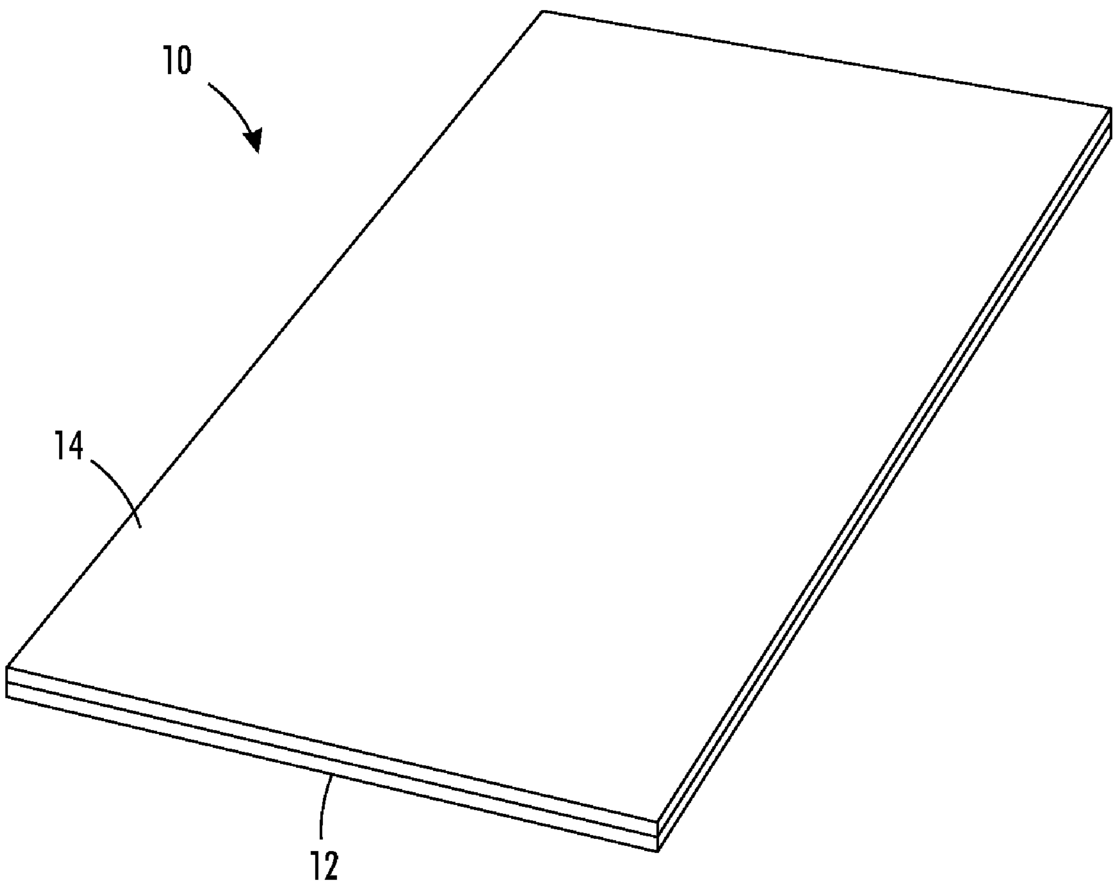
FIG. 1 is a perspective depiction of a transient document page having a photochromic coating which allows for writing an image in the coating on the page and for erasing an image from the coating.

FIG. 1 depicts a print medium 10 such as a paper sheet 12 coated, for example, with the reprintable chemical formulation 14 which is the subject of U.S. patent application Ser. No. 12/206,136 as discussed above. The chemical formulation can provide a long lasting image which can be erased in a shorter time than conventional inks. Printing of an image onto the entire sheet can be performed in one exposure by passing the light through a mask pattern using a lens system, or the image can be written or printed serially using a light pen, for example one which comprises the use of a computer-controlled UV laser or light emitting diode (UV LED). Erasing of the image can be performed using a single exposure to one or more of visible light, heat, and IR radiation (or heat supplied through IR radiation), although other erasing techniques are contemplated. For simplicity, the embodiments of the invention discussed below refer to erasure through IR radiation exposure to heat the transient document, but it will be understood that other or additional erasing techniques are also contemplated and within purview of various embodiments.

Handling of the coated media (also referred to herein as a "transient document" because of the transient nature of the image printed thereon) is required to expose the coating to UV light to image a pattern on the medium, and to expose the patterned medium to IR radiation to effect erasure of the printed image. A printing apparatus which exposes the formulation-coated medium to UV light to print the image and a separate erasing apparatus which exposes the formulation to IR radiation to erase the image can be used for effective processing of the print medium.

Figure 2:
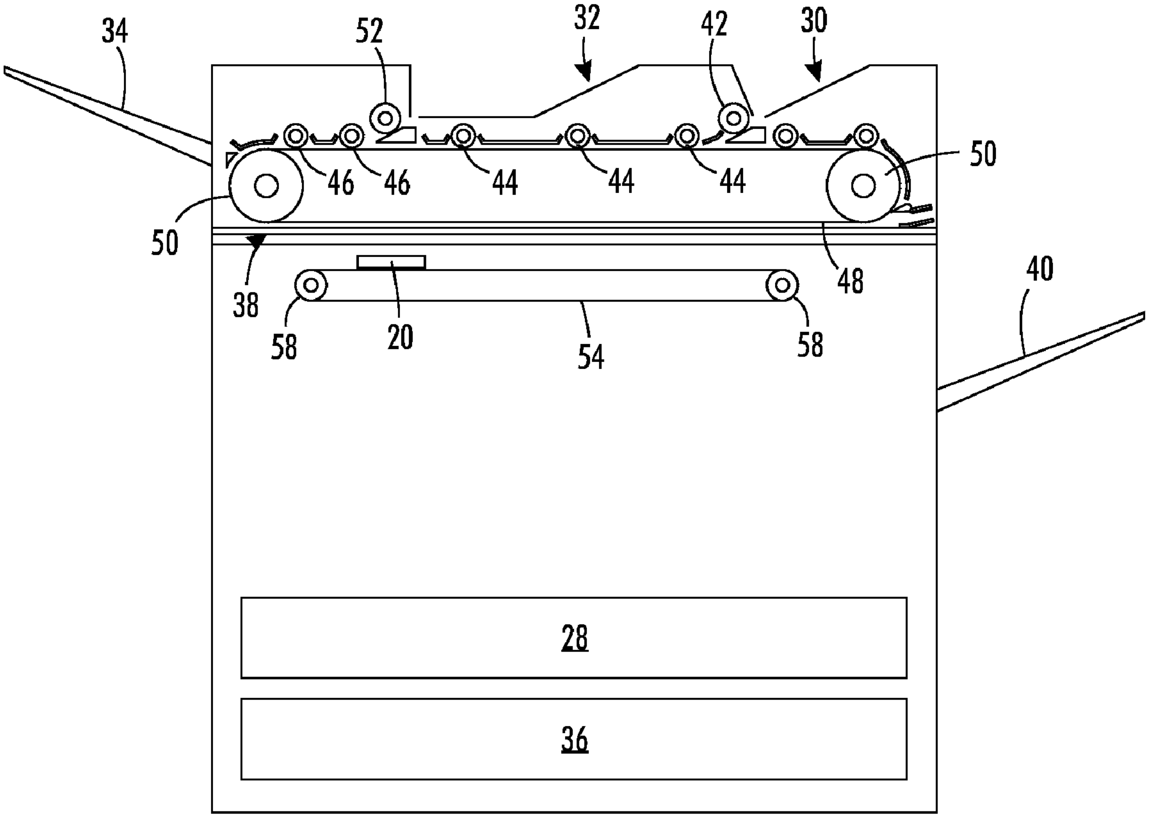
FIG. 2 is a cross section depicting an embodiment of a device for handling one or more pages such as that depicted in FIG. 1.

FIG. 2 is a cross section depicting an embodiment of the invention comprising a multipurpose device which scans, images, and erases transient documents such as a paper sheet coated with a photochromic alkoxy modified dithienylethene.

Figure 3:
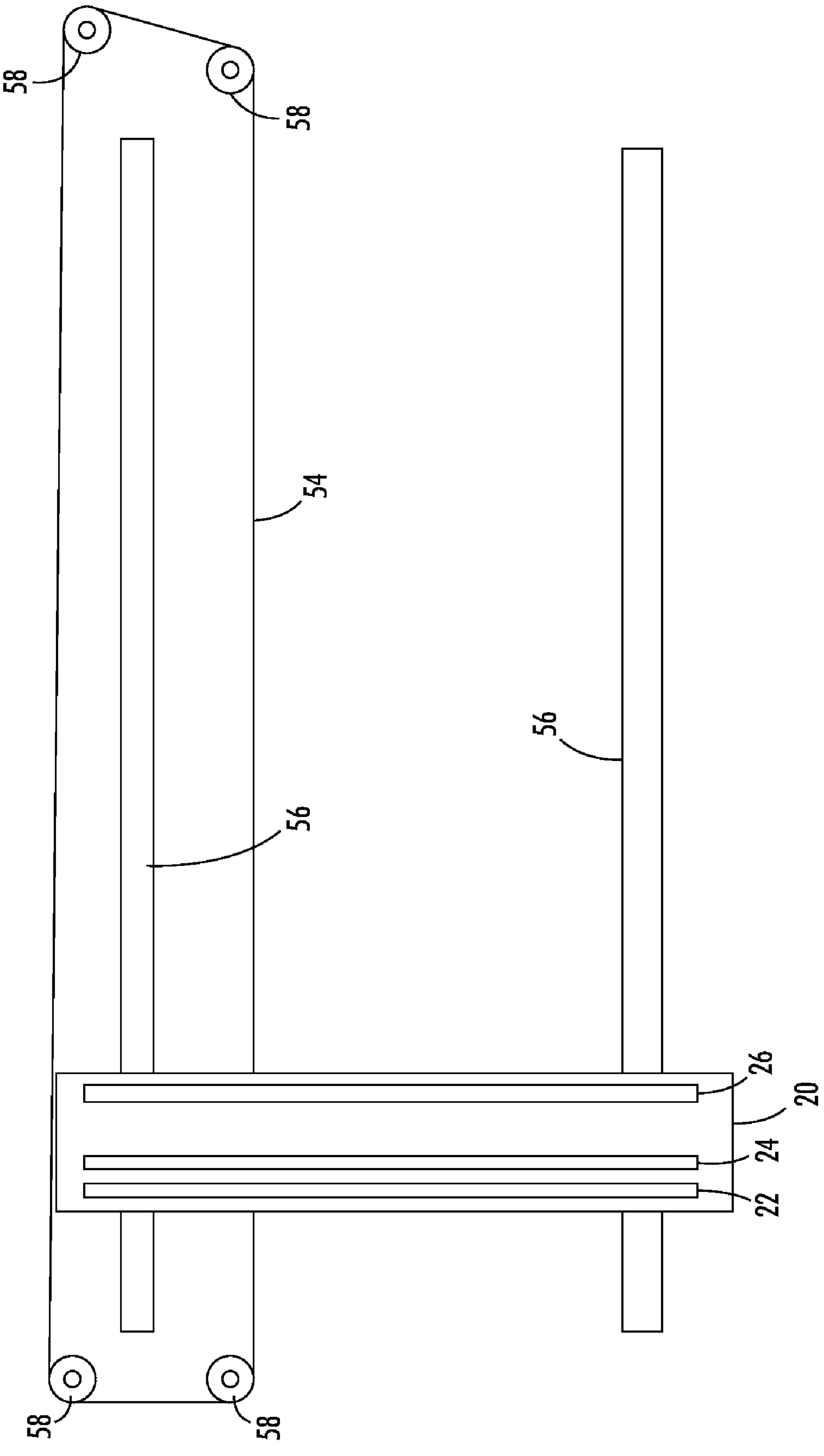
FIG. 3 is a plan view of a scan head and drive assembly of an embodiment of the invention.

FIG. 3 is a plan view detailing a scan head and drive assembly of FIG. 2.

As depicted in FIGS. 2 and 3, the device can be designed so that the transient document page is placed in a stationary position relative to a moving scan head, such as that found with a flatbed scanner device. In an alternate embodiment, the scan head can remain stationary while the transient document page is moved past the scan head.

As depicted in FIGS. 2 and 3, a scan head 20 comprises a scanning light source (scan bar) 22 which can comprise a wide spectrum lamp such as a fluorescent or xenon lamp, or multiple color light emitting diode (LED) emitter array which provides sufficient illumination of a previously printed or imaged page to allow the device to copy the printed page to a blank transient document or to an electronic file. For example, the scanning light source can provide a visible light wavelength in the range of about 400 nm to about 700 nm at an intensity sufficient to illuminate the page for copying. The wavelength and intensity of the scanning light source should be sufficient to allow for scanning but not for imaging or erasing, and will depend on the photochromic coating used. In an embodiment using a wide spectrum lamp, filters to remove UV and IR light, as well as other wavelengths which might undesirably erase or write to the photochromic coating.

The ink, toner, or photochromic pattern can be electronically coded by a scanner imager photodetector 24, such as a charge coupled device (CCD), CMOS imager, or a contact image sensor (CIS). A CCD array, for example, collects reflected photons from the image via mirrors (not individually depicted). In the case of the wide spectrum lamp, RGB filters can be employed, and photons can be collected on the CCD in grayscale, then a color image is produced by analyzing the number of photons reflected (absorbed) when each filter is used for a specific location on the page. From this information, an RGB colormap can be produced to result in a color image. In the case of an LED array outputting a number of different wavelengths, the spectrum will be narrow for each LED. To build a colormap with an LED array, one or more red LEDs are activated and the number of reflected photons received by the CCD array is analyzed to count the red depth (for example). The process is then repeated to determine the green depth and the blue depth. The depth of each wavelength is analyzed to result in a color image. It is to be understood that many variants are possible to produce a color, grayscale, or black and white image.

In a second embodiment, the device comprises an erasing light source (erase bar) 26 such as a thermal (heat) source supplied by IR radiation, or a visible light source which is sufficient to erase a printed image from the transient document. An exemplary IR light source comprises a quartz bulb (quartz halogen heater) which outputs a wavelength of $\geqq$1100 nm at an intensity and duration sufficient to erase the image from the photochromic coating. To expedite erasing of a transient document, more than one light source, such as activation of both an IR light source 24 and the scanning light source 22, can be utilized. To further decrease the time to erase the document, the intensity of the scanning light source can be increased during erasure, or both the IR source and a different light source optimized at a wavelength to minimize erasure time can be used. It may be desirable for the scanning light source to output a minimum intensity during a scan cycle to prevent fading of a transient document image, and to increase the intensity of the scan head during an erase cycle to expedite erasure of the image.

In a third embodiment, an imaging light source (imaging bar, not individually depicted) such as a UV light source is provided, for example at a wavelength of $\leqq$400 nm at an intensity and duration sufficient to produce an image, which will depend on the characteristics of the photochromic coating used. The imaging light source can be passed through a light mask to pattern the light source to print a desired image on the transient document, or the light source can comprise a light pen such as that provided by a UV laser. In either case, the imaging light source is patterned and imaged directly on the transient document to print a pattern on the document. In one embodiment, the imaging light source is internal to the machine, for example internal to a print engine (not individually depicted) and near the feed tray(s) 28, 36, and not on the scan bar. Other configurations are contemplated. Light shielding can be employed to ensure that stray light does not image transient documents near the UV light source.

The multipurpose device can also comprise a blank page storage area 28, which can be a blank page storage feed tray which stores blank (either unimaged or previously erased) sheets for subsequent use.

Further, the device can include an original (printed) page storage area 30 (i.e. a "to be copied" storage tray, for example) for storing one or more pages which are to be scanned and/or copied. Suitable documents to be scanned can include an imaged transient document or a conventional page printed using ink or toner. Once a document is copied, it can be returned to the "to be copied" storage tray 30. If the document to be copied includes more than one page, each page can be copied and returned to this tray serially. In the alternative, the device can also include a separate tray such as a "copy complete" tray which receives pages after they have been copied.

The multipurpose device can also comprise a "to be erased" page storage area 32, for example an erasure storage tray. The erasure storage tray can store one or more transient documents having an image which is to be erased. A separate erasure tray with sufficient warning indicia may reduce accidental erasure of documents which are to be copied. The design could allow for erasure from the "to be erased" tray and not allow erasure from the "to be copied" tray. In the alternative, a single tray which functions as both the "to be copied" tray and the "to be erased" tray is also envisioned. Once the sheets have been erased, they can be returned to the "to be erased" storage area 32, returned to a separate erased sheet output tray 34, or returned to a feed tray 36 for immediate reuse during subsequent copying.

Additionally, the device can comprise an automatic document feeder (ADF) which performs several document transportation functions. For example, the ADF can transfer a blank page from the blank page storage tray 28 to an imaging location (not individually depicted). At the imaging surface, the imaging light source such as a UV laser prints image on the blank page. Then, after imaging, the ADF transports the imaged transient document to a printed page storage area such as a printed page output tray 40.

Further, the ADF can transfer a printed page from the "to be copied" storage tray 30 to the scanning surface 38. The scanning light source 22 illuminates the printed page and the device scans and copies the image onto a blank transient document or to an electronic file for faxing or emailing. Thus an embodiment of the present invention also functions as an integrated fax machine. Additionally, the ADF can preferably transfer an imaged page from the erasure storage tray 32 to the scanning surface 38 where it is illuminated by the erasing light source 26.

Transport of pages can be performed using a series of rollers. For example, pickup roller 42 can select one sheet from the "to be copied" tray 30, and a series of rollers 44, 46, in conjunction with a rotating drive belt 48 and rollers 50, transports the sheet to the scanning surface 38. Similarly, a sheet to be erased is selected by pickup roller 52, and rollers 46, in conjunction with the drive belt 48 and drive belt rollers 50, transports the sheet to the scanning surface 38. The scan head 20 is moved using a drive assembly comprising a drive belt 54 connected to a drive motor (not depicted) along slide rails 56 using scan head drive belt rollers 58.

The multipurpose device can also include a control panel (not individually depicted) comprising, for example, a touch-pad or series of buttons which allows user control and a user-readable setup and status screen.

In use, the user can select one (or more) functions from a number of different functions provided by the multipurpose device through the use of the control panel.

To scan a previously printed document such as an ink or toner document or a transient document, for example, the user can place the document to be scanned in the "to be copied" storage tray 30 and select the copy function via the control panel. The ADF will transfer the document to be printed to the scanning surface 38 over the scan head 20, where the scanning source 22 illuminates the document sufficiently for scanning. The illuminated, original image pattern is scanned by the scanner imager 24 such as a CCD array and can be stored in memory (not individually depicted) within the device.

If the copied document is to be printed as a transient document, after scanning and storing the image, the document to be copied can be returned to the "to be copied tray" 30 and the print engine transports a blank page from the blank page feeder tray 28 to the imaging location, for example at a location internal to the device near the feeder tray(s). The original image pattern is retrieved from memory and imaged onto the transient document using the imaging light source. Imaging can be performed using a microprocessor for processing of the image and control of the imaging source, such as a UV laser, to print the image on the photochromic coating 14 on the transient document sheet 10. Once printed, each transient document page is transported by the ADF to the printed page output tray 40.

In an alternative to printing a scanned document (or in addition to printing the scanned document), the stored original image can be copied to a file for later use (faxing, emailing, printing) or can be immediately faxed, emailed, etc. via information supplied by the user through the control panel.

In another embodiment, the device scans the document to be copied and begins printing the scanned image on the blank transient document prior to completing the scan. Because, in this embodiment, the scanning source and the imaging source are at different locations of the device, this assists in minimizing the time from initiating the scan to completing the copy.

To erase a transient document, a user can place the page(s) to be erased in the erasure tray 32. After selecting the erase function from the control panel, the ADF selects each sheet in turn using pickup roller 54 and transports each page to be erased to the erase light source 26 where the document is illuminated (for example, using the IR light source 26 to heat the document and the scanning light source 22 to minimize erase time) to erase the document. The rate of movement of the scan head during erasure may be different than the rate of movement during scanning to ensure complete erasure in a minimum time. The conditions necessary to effect complete erasure of the document may vary depending on the chemical formulation used to coat the transient document. After erasing the document, the erased page can be transported by the ADF to the erased page tray 34, or returned to a separate blank page feed tray 36 or to feed tray 28 for immediate reuse.

If elevated temperature of the transient document is used as a condition for erasure, it is contemplated that the region where the document is erased (for example scanning surface 38) can be insulated to maximize thermal efficiency and to minimize the time required to effect complete erasure of a transient document. Similarly, it is contemplated that the multipurpose device can comprise a cooling unit such that, during scanning of a transient document, the scanning surface is cooled such that any undesired erasure of the document is minimized. This may be particularly useful for a scanning cycle which immediately follows an erasure cycle.

Additionally, if the multipurpose device comprises a flatbed design such as that depicted, the device can comprise a glass window for supporting the page during copying, writing, or erasing of an image. In another embodiment, a quartz window may have improved wavelength transmission properties over a glass window. For example, a quartz window may heat faster and hold heat better than a glass window and thus minimize erasure time.

A temperature sensor can be used to ensure that thermal conditions are sufficient to completely erase a transient document during an erase cycle. The temperature sensor can also be useful to ensure that the temperature in the region of the scan head is not elevated during a scan cycle, which could result in undesired erasure of a transient document being scanned.

An "archive" scan mode is also contemplated. In this mode, a user places a previously imaged transient document into the "to be copied" tray 30, and selects the archive mode from the control panel. The previously imaged transient document is scanned, and the original image pattern is stored in memory and written to a file. After scanning, the image is erased from the transient document, and the page can be transported by the ADF to the erased page tray 34 or to the blank page feed tray 28 or 36 for reuse. A temperature sensor would be useful in this mode, particularly if document erasure is at least partially carried out by elevated temperatures. The temperature sensor could be used to ensure that the temperature in the region of the scanning surface 38 has cooled sufficiently (or has been caused to cool through the use of a cooling element) after an erasure prior to transporting another transient document page to the scan head to prevent fading of the transient document image prior to scanning.

Thus various embodiments of the invention provide a method and device which is cost effective and allows for efficient handling and erasure of transient documents. In one embodiment, the image scanning device comprises a scan bar and an IR source, such as a quartz bulb, co-located on a scan bar to heat the chemical imaging formulation which coats the page and allows for a printable and erasable image pattern. Heating the page with the IR source effects or expedites erasure of an image from the coating. Additionally, the IR source can be enabled simultaneously with the scanning light source to more quickly erase the page, or with another light source having a wavelength optimized for erasure. A multipurpose device comprising the invention can comprise various elements, such as: a separate tray/divider for storing transient documents which are no longer needed (ready to be erased); a separate tray/divider for holding sheets that have been erased and are ready to be used again; a separate erase mode that turns on the heater and scans at the necessary rate to erase a document; a user interface to initiate an erase sequence, and; insulation of the ADF to minimize energy loss if the heating cycle is long.

The embodiments of the present teachings conveniently manage transient documents to expose them to the necessary wavelengths of light to scan, print, and erase a transient document. The multipurpose device can be controlled by a microprocessor contained within the device, or it can be controlled by a separate computer or microprocessor which is part of a larger network of devices, such as a plurality of office devices, printing devices, etc.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A device for handling a transient document, comprising:

a scanning light source for illuminating at least one page of a document; and an erasing light source for erasing an imaged pattern on at least one page of a transient document, wherein the scanning light source and the erasing light source are both located on a scan head of the device; and the scan head is adapted such that during a scan cycle, only the scanning light source is activated, and that during an erase cycle, both the scanning light source and the erasing light source are activated to erase the imaged pattern from the at least one page of the transient document.

2. The device of claim 1, wherein the erasing light source provides infrared radiation at a sufficient intensity to erase the imaged pattern from the at least one page of the transient document.

3. The device of claim 1, further comprising an imaging light source for imaging a pattern on a transient document blank page.

4. The device of claim 3, wherein the imaging light source is located internal to a print engine and provides ultraviolet light at a sufficient intensity to image a pattern on the transient document.

5. The device of claim 4, wherein the imaging light source is located at an imaging location and the scan head is located at a scanning location which is different than the imaging location.

6. The device of claim 1, further comprising:

a blank page storage area for storing at least one transient document page having no pattern imaged thereon;

a printed page storage area for storing at least one document page which is to be copied using the scanning light source to illuminate the at least one document page which is to be copied; and a "to be erased" page storage area for storing at least one transient document page having a pattern thereon which is to be erased using the erasing light source on the scan head.

7. The device of claim 6 further comprising a control panel which allows user selection of at least a copy function for copying a previously printed page and an erase function for erasing a previously printed transient document page.

8. The device of claim 1 adapted such that a first intensity output by the scanning light source during an erase cycle is greater than a second intensity output by the scanning light source during the scan cycle.

9. The device of claim 1 further comprising an automatic document feeder adapted to:

transport at least one blank transient document page from a blank page tray to an imaging location internal to the device;

transport at least one page of a document to be copied from a "to be copied" tray to the scan head; and transport at least one page of a document to be erased from an erasure tray to the scan head.

10. The device of claim 9 wherein the "to be copied" tray and the erasure tray are a single tray.

11. The device of claim 1 further comprising a temperature sensor at a location sufficient to monitor a temperature near the scan head.

12. A method for handling a document, comprising:

transporting a first page having an image thereon to a scan head;

illuminating the first page with a scanning light source on the scan head;

using the illumination of the scanning light source to scan the first page;

transporting a second page having an image thereon to the scan head;

illuminating the second page with the scanning light source and an erasing light source on the scan head;

using the illumination of the scanning light source and the erasing light source to erase the image on the second page.

13. The method of claim 12, further comprising:

after scanning the first page, storing an electronic copy of the first page in memory;

after storing the electronic copy of the first page in memory, illuminating the first page with the erasing light source; and using the illumination of the erasing light source to erase the image on the first page.

14. The method of claim 12 further comprising illuminating the second page with an infrared light source to heat the second page during the illumination of the second page with the erasing light source.

15. The method of claim 12 further comprising:

transporting a third page having no image thereon to an imaging location;

illuminating the third page with a third light source; and using the illumination of the third light source to image a pattern onto the third page.

16. The method of claim 12 further comprising illuminating the third page with an ultraviolet light source to image the pattern onto the third page.

* * * * *